(12) United States Patent
Maruoka et al.

(10) Patent No.: US 9,393,908 B2
(45) Date of Patent: Jul. 19, 2016

(54) OBSTACLE ALARM DEVICE

(75) Inventors: Tetsuya Maruoka, Anjo (JP); Akira Kadoya, Kitanagoya (JP); Keigo Ikeda, Anjo (JP)

(73) Assignee: AISIN SEIKI KABUSHIKI KAISHA, Aichi (JP)

( * ) Notice: Subject to any disclaimer, the term of this patent is extended or adjusted under 35 U.S.C. 154(b) by 489 days.

(21) Appl. No.: 13/483,828

(22) Filed: May 30, 2012

(65) Prior Publication Data

US 2013/0107051 A1    May 2, 2013

Related U.S. Application Data

(63) Continuation-in-part of application No. PCT/JP2012/060397, filed on Apr. 18, 2012, and a continuation-in-part of application No. PCT/JP2011/075125, filed on Nov. 1, 2011.

(51) Int. Cl.
| | |
|---|---|
| *H04N 7/18* | (2006.01) |
| *B60R 1/00* | (2006.01) |
| *G01S 11/12* | (2006.01) |
| *B60W 50/14* | (2012.01) |
| *B60W 30/08* | (2012.01) |

(52) U.S. Cl.
CPC ............... *B60R 1/00* (2013.01); *B60W 30/08* (2013.01); *B60W 50/14* (2013.01); *G01S 11/12* (2013.01); *H04N 7/183* (2013.01); *B60R 2300/8093* (2013.01); *B60W 2050/146* (2013.01)

(58) Field of Classification Search
CPC ............................ B60R 1/00; B60R 2300/105
USPC ................................................... 348/148, 25
See application file for complete search history.

(56) References Cited

U.S. PATENT DOCUMENTS

| | | | |
|---|---|---|---|
| 7,043,346 B2* | 5/2006 | Kubota | B62D 15/0285 340/932.2 |
| 2002/0175999 A1 | 11/2002 | Mutobe et al. | |
| 2004/0201674 A1 | 10/2004 | Miyazaki et al. | |
| 2006/0022810 A1 | 2/2006 | Inoue et al. | |
| 2008/0205706 A1 | 8/2008 | Hongo | |
| 2009/0268074 A1* | 10/2009 | Sugino | 348/333.02 |
| 2010/0118146 A1* | 5/2010 | Schofield | B60R 1/00 348/148 |

(Continued)

FOREIGN PATENT DOCUMENTS

| | | |
|---|---|---|
| CN | 1461561 A | 12/2003 |
| CN | 1727848 A | 2/2006 |

(Continued)

OTHER PUBLICATIONS

International Search Report of PCT/JP2011/075125, dated Dec. 13, 2011.

(Continued)

*Primary Examiner* — William C Vaughn, Jr.
*Assistant Examiner* — Jerry Jean Baptiste
(74) *Attorney, Agent, or Firm* — Sughrue Mion, PLLC

(57) ABSTRACT

An obstacle alarm device having a captured image acquisition unit, an attention-prioritized captured image generation unit, an object presence determination unit, a movement direction determination unit, and a clear indication image output unit for causing a frame sign to be displayed at sequentially varying positions centerward from an outer edge part of the attention-prioritized captured image, and for repeatedly performing such displaying, in a case where the movement direction determination unit has determined that the object is moving toward the center of the attention-prioritized captured image.

7 Claims, 10 Drawing Sheets

(56) References Cited

U.S. PATENT DOCUMENTS

| | | | | |
|---|---|---|---|---|
| 2010/0134264 A1* | 6/2010 | Nagamine | B60Q 9/005 | 340/435 |
| 2010/0219010 A1* | 9/2010 | Kadowaki | B62D 15/0285 | 180/204 |
| 2011/0025848 A1* | 2/2011 | Yumiba | B60R 1/00 | 348/148 |
| 2011/0128138 A1* | 6/2011 | Yamamoto et al. | | 340/436 |
| 2011/0285850 A1* | 11/2011 | Lu | B60Q 1/1423 | 348/148 |

FOREIGN PATENT DOCUMENTS

| | | |
|---|---|---|
| CN | 101256073 A | 9/2008 |
| CN | 201380816 Y | 1/2010 |
| JP | 11-115660 A | 4/1999 |
| JP | 2005-266899 A | 9/2005 |
| JP | 2007-069806 A | 3/2007 |
| JP | 2008-009843 A | 1/2008 |
| JP | 2009-217740 A | 9/2009 |
| JP | 2010-093610 A | 4/2010 |
| JP | 2010-202010 A | 9/2010 |
| JP | 2010-210486 A | 9/2010 |

OTHER PUBLICATIONS

European Search Report for corresponding Application No. 12845726.4 issued Feb. 24, 2015.

Chinese Office Action for corresponding Application No. 201280042223.3 issued Mar. 23, 2015.

* cited by examiner

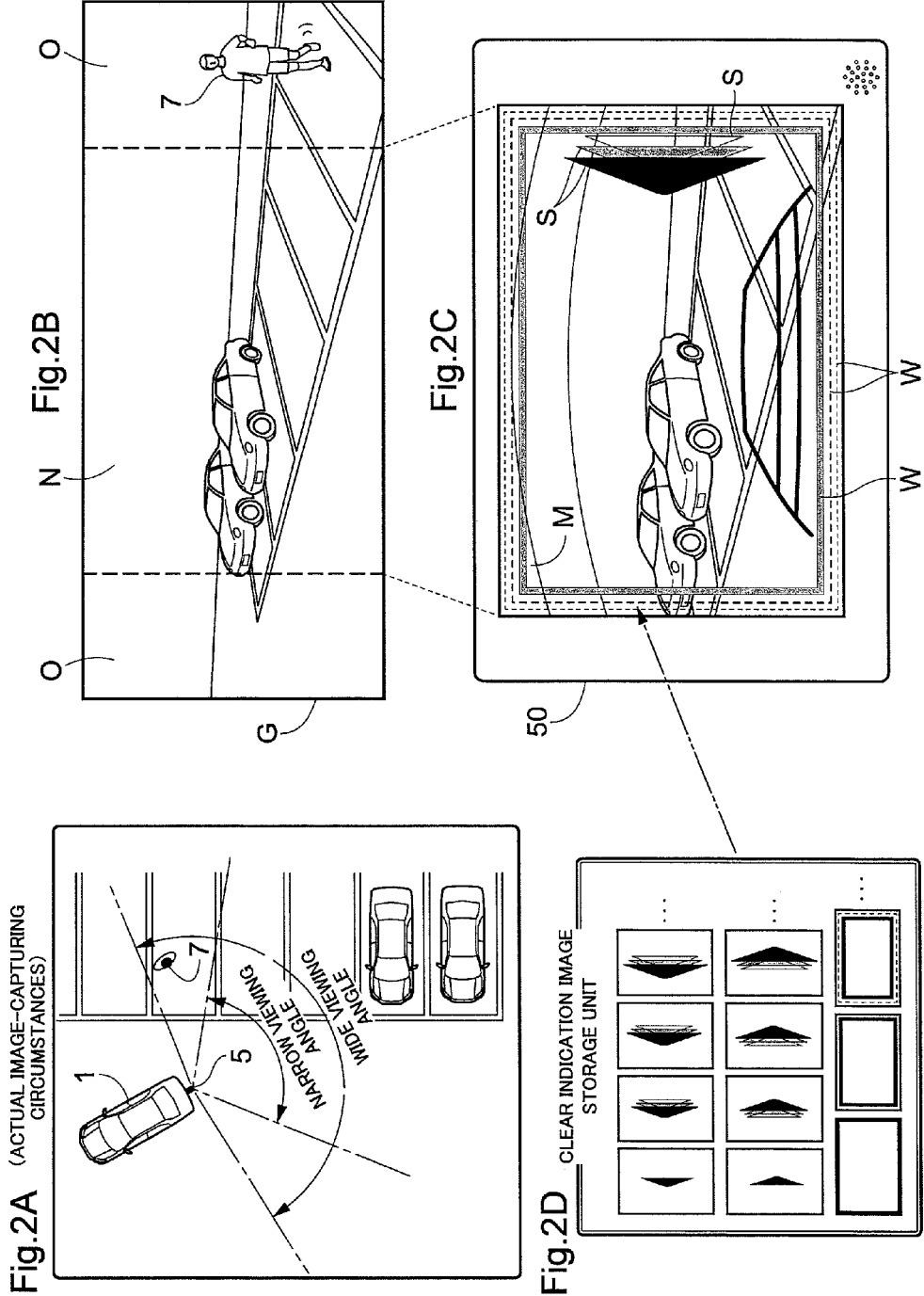

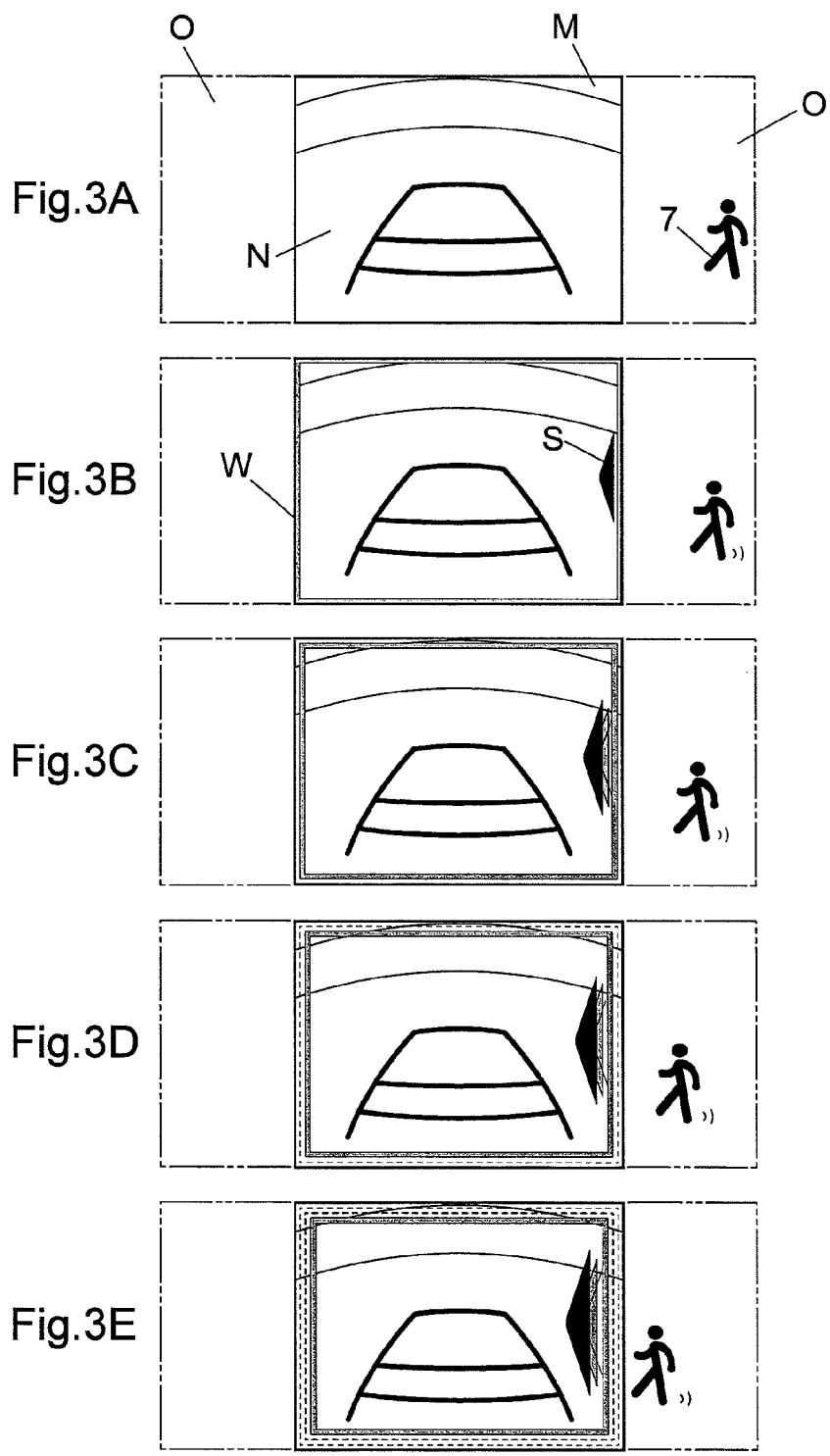

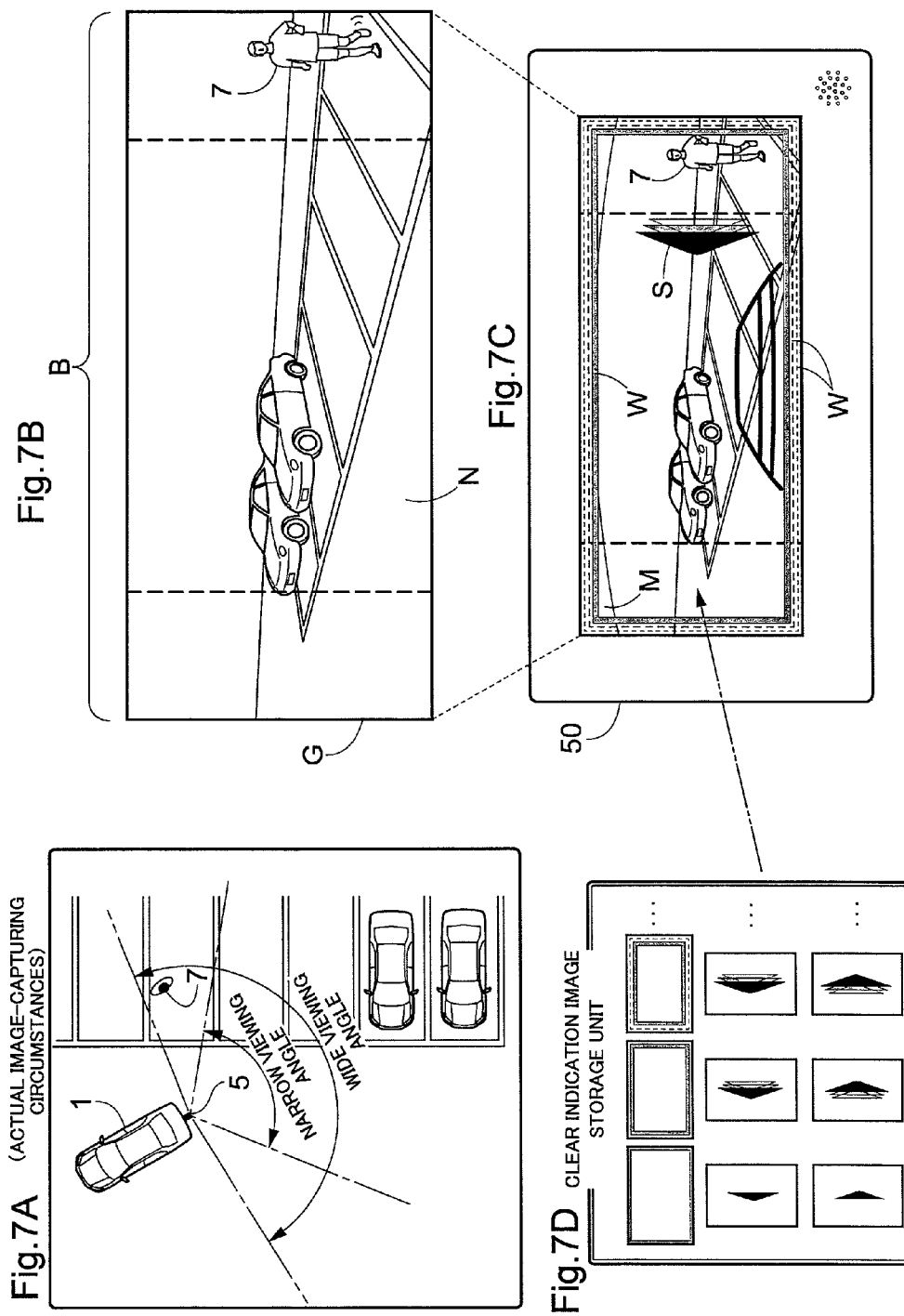

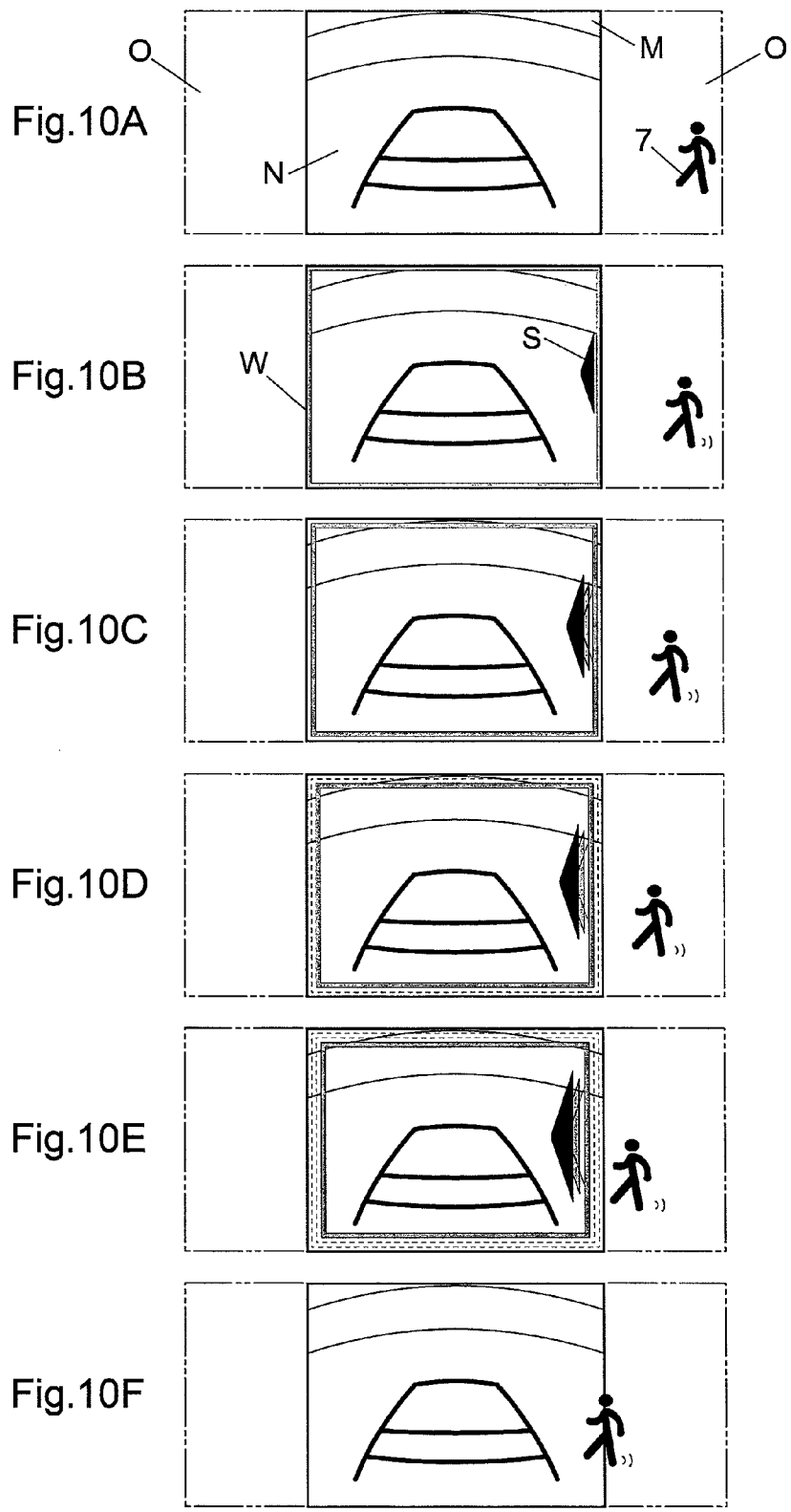

OBSTACLE ALARM DEVICE

TECHNICAL FIELD

The present invention relates to an obstacle alarm device for clearly indicating, to an occupant, the presence of an obstacle approaching a vehicle.

BACKGROUND ART

The periphery of a vehicle includes blind spots which cannot be viewed from the position of the driver, and the driver must pay close, careful attention to the periphery of the vehicle when driving the vehicle. In particular, in a case where a vehicle is being driven in reverse and parked, many users have a poor awareness of the actual act of parking, and the mental fatigue as well is not negligible. In view whereof, conventionally technology for monitoring an obstacle in the periphery of the vehicle has been used (for example, Patent Documents 1 and 2).

A vehicle obstacle alarm device recited in Patent Document 1 is configured to comprise lateral movement obstacle detecting means, lateral movement direction detecting means, and lateral movement information providing means. The lateral movement obstacle detecting means detects an obstacle moving in front of the vehicle in a direction intersecting a direction of travel. The lateral movement direction detecting means detects the lateral movement direction of the obstacle detected by the lateral movement obstacle detecting means. The lateral movement information providing means provides a driver with information relating to the lateral movement direction of the obstacle detected by the lateral movement direction detecting means. Therein, the lateral direction information providing means displays, on a display, an arrow representing the lateral movement direction detected by the lateral movement direction detecting means, on a display unit.

A vehicle periphery monitoring device recited in Patent Document 2 is configured to comprise image-capturing means, obstacle detecting means, and displaying means. The image-capturing means captures an image of a vehicle periphery, including a part of an automobile. The obstacle detecting means detects an obstacle located in the vehicle periphery, and calculates the distance between the detected obstacle and the automobile. The displaying means displays, on a single screen, a captured image captured by the image-capturing means as well as an obstacle display image illustrating the distance calculated by the obstacle detecting means.

PRIOR ART DOCUMENTS

Patent Documents

[Patent Document 1] Japanese Laid-open Patent Application No. 11-115660
[Patent Document 2] Japanese Laid-open Patent Application No. 2009-217740

DISCLOSURE OF THE INVENTION

Problems That the Invention is Intended to Solve

As per the technologies recited in Patent Document 1 and Patent Document 2, the obstacle in the periphery of the vehicle is detected and a screen displays information (an arrow or the like) clearly indicating the obstacle, thereby making it possible to inform a driver of the presence of the obstacle in the periphery of the vehicle. However, a display built into a vehicle (the displaying means) is not one having a large screen size. For this reason, when the arrow or the like is displayed on an image for illustrating the circumstances of the periphery of the vehicle displayed on the display, there is the possibility that it will become difficult to see the circumstances of the periphery of the vehicle, or that it will become impossible to be made aware of the obstacle.

In view of the foregoing problem, it is an objective of the present invention to provide an obstacle alarm device making it possible to clearly indicate the presence of an obstacle approaching the vehicle to the driver without it becoming difficult to see the circumstances of the periphery of the vehicle.

Means for Solving the Problems

A technical aspect of the obstacle alarm device according to the present invention adapted to achieve the aforesaid aim comprises:

a captured image acquisition unit for acquiring a captured image in which an image of a visual scene of a periphery of a vehicle has been captured;

an attention-prioritized captured image generation unit for generating an attention-prioritized captured image on the basis of the captured image;

an object presence determination unit for determining whether or not an object is present in a periphery of the vehicle;

a movement direction determination unit for determining a movement direction of the object; and a clear indication image output unit for causing a frame sign, which has a smaller outer shape than an outline of the attention-prioritized captured image and is turned on for a fixed duration of time and thereafter turned off, to be displayed at sequentially varying positions from an outer edge part of the attention-prioritized captured image toward a center thereof, and for repeatedly performing such displaying, in a case where the movement direction determination unit has determined that the object is moving toward the center of the attention-prioritized captured image.

According to the technical aspect of such description, the presence and the direction of an object approaching the vehicle can be clearly indicated to the driver even though the object may not be represented in a screen of a display device (for example, a monitor) provided to the vehicle. Accordingly, an object approaching the vehicle will no longer go unnoticed even in a case where the screen size of the display device is small. Because a frame sign of such description is displayed on a side end part of the screen, it will not be harder for the driver to see the circumstances of the periphery of the vehicle. Accordingly, it becomes possible for the presence of an obstacle (the object) approaching the vehicle to be clearly indicated to the driver without it becoming difficult to see the circumstances of the periphery of the vehicle.

Preferably, the attention-prioritized captured image generation unit generates a center portion of the captured image as the attention-prioritized captured image, and the object presence determination unit determines whether or not the object is present in an outside region of the exterior of the attention-prioritized captured image.

According to technical aspect of such description, it is possible for the presence and the direction of the object approaching the vehicle to be clearly indicated to the driver, while the circumstances of the periphery of the vehicle are also being displayed, at a point in time where the object approaching the vehicle comes into the outside region, even though the object may not be represented in the screen of the display device (for example, a monitor) provided to the vehicle.

Alternatively, the attention-prioritized captured image generation unit may generate the entirety of the captured image as the attention-prioritized captured image, and the object presence determination unit may determine whether or not the object is present in a region corresponding to the attention-prioritized captured image.

According to the technical aspect of such description, it is possible for the presence and the direction of the object approaching the vehicle to be clearly indicated to the driver, while the circumstances of the periphery of the vehicle are also being displayed, at a point in time where the object approaching the vehicle comes into the image-capturing range.

Further, a configuration may be adopted such that, in a case where there are a plurality of frame signs, a frame sign displayed later is of smaller size than a frame sign displayed immediately prior.

According to the technical aspect of such description, the frame signs can be displayed as though heading toward the center of the screen. Accordingly, the driver is more readily able to recognize the approach of the obstacle.

A configuration may also be adopted such that, in a case where there are a plurality of frame signs, a frame sign displayed later is of lower transparency than a frame sign displayed immediately prior.

According to the technical aspect of such description, the frame signs can be displayed as though heading towards the center of the screen. Accordingly, the driver is more readily able to recognize the approach of the obstacle. Further, because the visual scene displayed at the end part of the screen will not be hidden, it becomes possible to appropriately become aware of the obstacle even in a case where the obstacle has rapidly rushed out.

Preferably, there is adopted a configuration such that the clear indication image output unit discontinues the outputting of the frame sign in a case where the object has entered a region corresponding to the attention-prioritized captured image.

According to the technical aspect of such description, because the display of the frame sign can be discontinued at a point in time where the object is represented in the screen of the display device (in the display image), the object will not be hidden by the frame sign. Accordingly, it is possible for the object having approached the vehicle to be appropriately viewed.

BRIEF DESCRIPTION OF THE DRAWINGS

FIG. 2 is a drawing illustrating an example of processing in the obstacle alarm device according to the first embodiment;

FIG. 3 is a drawing illustrating an example of a composite image according to the first embodiment;

FIG. 7 is a drawing illustrating an example of processing in the obstacle alarm device according to the second embodiment;

FIG. 10 is a drawing illustrating a composite image according to another embodiment.

BEST MODE FOR CARRYING OUT THE INVENTION

1. First Embodiment

The following is a detailed description of an embodiment of the present invention. An obstacle alarm device 100 according to the present invention is provided with a function for clearly indicating to a driver of a vehicle, in a case where an object approaching the vehicle exists, that the object is approaching. The following description refers to the accompanying drawings.

Figure 1:
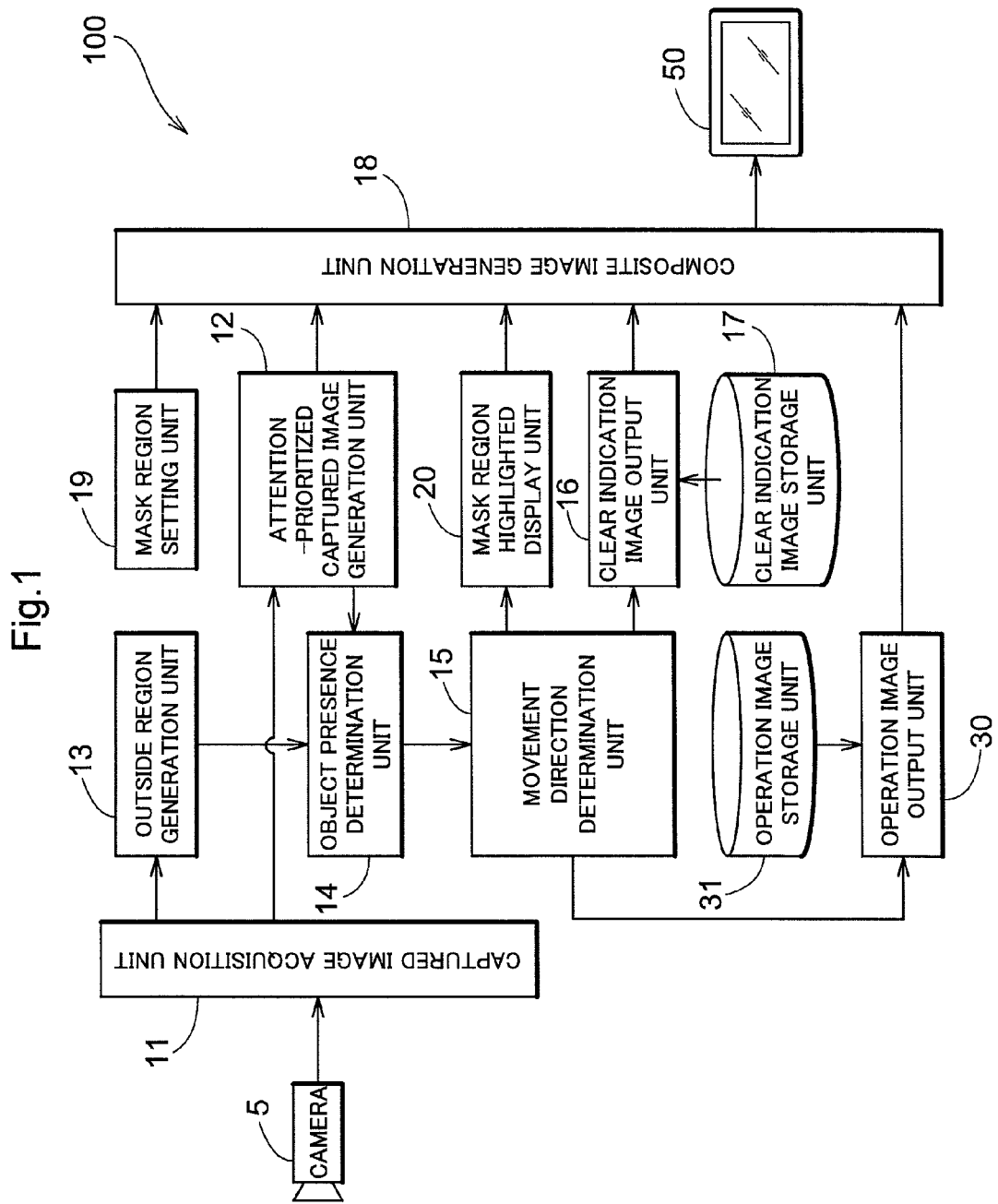
FIG. 1 is a block diagram schematically illustrating a configuration of an obstacle alarm device according to a first embodiment.

FIG. 1 is a block diagram schematically illustrating a configuration of an obstacle alarm device 100. As illustrated in FIG. 1, the obstacle alarm device 100 is configured to be provided with various functional units including a captured image acquisition unit 11, an attention-prioritized captured image generation unit 12, an outside region generation unit 13, an object presence determination unit 14, a movement direction determination unit 15, a clear indication image output unit 16, a clear indication image storage unit 17, a composite image generation unit 18, a mask region setting unit 19, a mask region highlighted display unit 20, an operation image output unit 30, and an operation image storage unit 31. Each of the aforementioned functional units adapted for performing various forms of processing for using a CPU as a core member to clearly indicate, to a driver of a vehicle 1, the approach of an object 7 is constructed of hardware, software, or both hardware and software.

The captured image acquisition unit 11 acquires a captured image G in which an image of a visual scene of a periphery of the vehicle 1 has been captured. Herein, a camera 5 is provided to the vehicle 1. The camera 5 in the present embodiment is constituted of a digital camera for outputting image-capturing information as video information, the digital camera having a built-in charge-coupled device (CCD), a complementary metal-oxide-semiconductor (CMOS) image sensor (CIS), or other imaging element. The camera 5 of such description, as is illustrated in FIG. 2A, is arranged in the vicinity of a license plate provided to an outside rear part of the vehicle 1, in the vicinity of an emblem provided to the outside rear part of the vehicle 1, or elsewhere, so as to have a slight angle of depression toward the rear of the vehicle 1. The camera 5 is configured so as to be provided with a wide-angle lens (not shown). This makes it possible to capture an image the visual scene of the periphery of the vehicle 1 over a substantially 180° span of the rear of the vehicle 1. The image-capturing range of such description is indicated as a "wide viewing angle" in FIG. 2A. The camera 5 has the ability to output video as a captured image G in real-time. The captured image G of such description is transmitted to the captured image acquisition unit 11.

FIG. 2B illustrates an example of the captured image G of such description. The entire width of FIG. 2B corresponds to the wide viewing angle in FIG. 2A. Herein, the captured image G has undergone mirror image processing such that the object 7, which is on the left side when the rear is viewed from the vehicle 1 as per the illustration in FIG. 2A, is now on the right side within the captured image G, as illustrated in FIG. 2B. This is because when the visual scene of the rear of the vehicle 1 is displayed on the monitor 50, the driver of the vehicle 1 will be more able to intuitively comprehend whether the object 7 included in the captured image G is present on the left side of the vehicle 1 or is present on the right side thereof.

The following description again relates to FIG. 1. The attention-prioritized captured image generation unit 12 generates an attention-prioritized captured image on the basis of the captured image G. In the present embodiment, the image-capturing range of the captured image G is the wide viewing angle. For this reason, the attention-prioritized captured image generation unit 12 generates a narrow viewing region N, which is a center portion of the captured image G, as the attention-prioritized captured image. The captured image G is transmitted from the aforementioned captured image acquisition unit 11. In the present embodiment, the attention-prioritized captured image is equivalent to a center portion of the captured image G in the lateral direction illustrated in FIG. 2B. The narrow viewing region N of such description is preferably made to be, for example, a region about 120° to 130° to the rear of the vehicle 1, as per the "narrow viewing angle" in FIG. 2A. Because the narrow viewing region N is near to being the range of possible travel when the vehicle 1 is reversing, this region requires particular attention among the regions of the captured image G, and is accordingly called the "attention-prioritized captured image." The attention-prioritized captured image of such description corresponds to a display image displayed on a monitor 50 described below (see FIG. 2C). In the present embodiment, the "attention-prioritized captured image" is described as being an image of the "narrow viewing region."

The outside region generation unit 13 generates an outside region O outside of the attention-prioritized captured image. Specifically, an outside region O outside of the narrow viewing region N from among the regions of the captured image G is generated. As in the description above, the narrow viewing region N is generated by the attention-prioritized captured image generation unit 12 in the center portion of the captured image G in the lateral direction. The outside region generation unit 13 generates the outside region O as in FIG. 2B on the outside in the lateral direction of the narrow viewing region N of such description. The outside region O generated by the outside region generation unit 13 is transmitted to the object presence determination unit 14, which shall be described below.

The object presence determination unit 14 determines whether or not the object 7 is present in the periphery of the vehicle 1. In the present embodiment, the object presence determination unit 14 determines whether or not the object 7 is present in the outside region O. The outside region O is transmitted from the outside region generation unit 13. In the present embodiment, the determination of whether or not the object 7 is present in the outside region O is performed referring to the outside region O and using, for example, pattern matching or another known form of image recognition processing. It will be readily understood that processing other than pattern matching can be used to determine whether or not the object 7 is present in the outside region O. The determination results from the object presence determination unit 14 are transmitted to the movement direction determination unit 15, which shall be described below.

The movement direction determination unit 15 determines a movement direction of the object 7 in the outside region O. The determination of the movement direction of such description is performed in a case where a determination has been made by the object presence determination unit 14 that the object 7 is present in the outside region O. In particular, in the present embodiment, the movement direction determination unit 15 determines whether or not the object 7 in the outside region O is moving toward the narrow viewing region N. "Moving toward the narrow viewing region N" indicates movement behind the vehicle 1 from outside the width direction of the vehicle 1 and in the direction of being directly behind the vehicle 1. The determination of such description can possibly also be performed by, for example, comparing the position of the object 7 in the most recent captured image G and the position of the object 7 in the captured image G from a predetermined duration of time prior, or can be performed using a known technique such as one using optical flow. The determination results of the movement direction of such description are transmitted to the clear indication image output unit 16, which shall be described below.

In a case where a determination has been made by the movement direction determination unit 15 that the object 7 in the outside region O is moving toward the center of the attention-prioritized captured image, the clear indication output unit 16 causes a sign S, which is turned on for a fixed duration of time and thereafter turned off, to be displayed at sequentially varying positions centerward from the side of the attention-prioritized captured image pertaining to the outside region O in which the object 7 is present, and repeatedly performs the relevant displaying. Herein, in the present embodiment, the attention-prioritized captured image is equivalent to an image of the narrow viewing region N. Accordingly, in a case where the object 7 in the outside region O is moving toward the narrow viewing region N side of the vehicle 1, the clear indication image output unit 16 causes the sign S, which is turned on for a fixed duration of time and thereafter turned off, to be displayed at sequentially varying positions centerward from the side of the narrow viewing region N pertaining to the outside region O in which the object 7 is present, and repeatedly performs the relevant displaying. The question of whether or not the object 7 in the outside region O is moving to the narrow viewing region N side of the vehicle 1 is determined by the movement direction determination unit 15. The side of the narrow viewing region N pertaining to the outside region O where the object 7 is present is equivalent to a region on the left side in the narrow viewing region N in a case where the object 7 is in the outside region O on the left side, and is equivalent to a region on the right side in the narrow viewing region N in a case where the object 7 is in the outside region O on the right side.

The sign S being turned off after having been turned on for a fixed duration of time indicates not a state where the sign S is being displayed continuously but rather a state where the sign S is displayed in a flashing manner. According to the present embodiment, in a case where the sign S of such description is turned off after being displayed and is then displayed once more, the sign S is displayed at varying positions. Accordingly, the sign S enters a state of moving between two predetermined positions on the screen while flashing. The clear indication image output unit 16 repetitively moves the sign S while it flashes.

A description of the sign S shall now be provided. The sign S according to the present embodiment is configured to have an arrow shape having a convex part projecting toward the center of the attention-prioritized captured image (the narrow viewing region N). The sign S of such description is stored in the clear indication image storage unit 17, as illustrated by FIG. 2D. FIG. 2C illustrates an image which is displayed on the monitor 50 of the vehicle 1 in a case where the object 7 is in the captured image G as illustrated in FIG. 2B, i.e., is in the outside region O on the right side. As illustrated in FIG. 2C, in the present embodiment, a plurality of the signs S are sometimes displayed on the monitor 50. In such a case, the plurality of signs S are displayed at positions where there is partial superimposition therebetween. "There is partial overlap", in the present embodiment, means that there is overlap between a portion of one of the plurality of the signs S, on the side of the convex part of the arrow shape, and a portion of another of the plurality of signs S, on the side of the arrow shape where there is no convex part. Further, in the case where there are a plurality of the signs S, the configuration for the overlapping portions between a sign S to be displayed later and a sign S displayed immediately prior is such that the sign S to be displayed later is displayed overridingly. Specifically, the configuration is such that the sign S to be displayed later is arranged on a higher layer than is the sign S displayed immediately prior. In the present embodiment, the sign S of such description being displayed immediately prior is displayed at a higher transparency than is the sign S to be displayed later. Specifically, the sign S to be displayed later is displayed at a lower transparency than is the sign S displayed immediately prior. Accordingly, in the case where a plurality of the signs S are displayed, the sign S on the uppermost layer has the lowest transparency, and the sign S on the lowermost layer has the highest transparency.

The sign S is further configured such that the sign S to be displayed later is of larger size than the sign S displayed immediately prior. Accordingly, in the case where a plurality of the signs S are displayed, the sign S on the uppermost layer has the largest size, and the sign S on the lowermost layer has the smallest size. The magnitude of size of each of the signs S may be set with mutually similar shapes, or the magnitude of size thereof may be set with either the longitudinal or lateral length of the sign S having been altered.

The clear indication image output unit 16 repeatedly performs such a display. Herein, in the present embodiment, as illustrated in FIG. 2C, the sign S is composited onto the attention-prioritized captured image, which is the narrow viewing region N, and displayed on the monitor 50. In view whereof, the composite image generation unit 18 generates a composite image where the sign S is composited onto the attention-prioritized captured image. The image as per the illustration in FIG. 2C is thereby generated.

Displaying the sign S in such a manner makes it possible to cause the sign S to be displayed so as to gradually become larger. This makes it possible to visually provide a clear indication to the occupant of the vehicle 1 that the object 7 is approaching the vehicle 1.

Furthermore, in a case where the movement direction determination unit 15 has determined that the object 7 in the outside region O is moving toward the center of the attention-prioritized captured image, the clear indication image output unit 16 causes a frame sign W, which has a smaller outer shape than the outline of the attention-prioritized captured image and is turned on for a fixed duration of time and thereafter turned off, to be displayed at sequentially varying positions centerward from an outer edge part of the attention-prioritized captured image, and repeatedly performs such displaying. Herein, in the present embodiment, the attention-prioritized captured image is equivalent to the narrow viewing region N. Accordingly, in a case where the object 7 in the outside region O is moving toward the narrow viewing region N, the clear indication image output unit 16 causes the frame sign W, which has a smaller outer shape than the outline of the narrow viewing region N and is turned on for a fixed duration of time and thereafter turned off, to be displayed at sequentially varying positions centerward from an outer edge part of the narrow viewing region N, and repeatedly performs such displaying. Herein, as in the description above, the attention-prioritized captured image, which is the narrow viewing region N, is displayed on the monitor 50. Accordingly, that the frame sign W has a smaller outer shape than the outline of the narrow viewing region N signifies that the frame sign W is of smaller size than the screen of the monitor 50. The question of whether or not the object 7 in the outside region O is moving to the narrow viewing region N of the vehicle 1 is determined by the aforedescribed movement direction determination unit 15.

The frame sign W being turned off after having been turned on for a fixed duration of time indicates not a state where the frame sign W is being displayed continuously but rather a state where the frame sign W is displayed in a flashing manner. In the present embodiment, the frame sign W of such description is displayed and thereafter is turned off, and is once again displayed later, in which cases the frame sign W is displayed at varying centerward positions. Accordingly, the frame sign W is displayed so as to gradually become smaller. The clear indication image output unit 16 repeatedly moves the frame sign W while it flashes.

A description of the frame sign W shall now be provided. The frame sign W according to the present embodiment is configured to have a smaller outer shape than the outline of the attention-prioritized captured image (the narrow viewing region N). As illustrated in FIG. 2C, in the present embodiment, a plurality of the frame signs W are sometimes displayed on the monitor 50. In such a case, the frame sign W is configured such that a frame sign W to be displayed later is of smaller size than a frame sign W displayed immediately prior. The frame sign W is also configured such that the frame sign W to be displayed later has a lower transparency than does the frame sign W displayed immediately prior. This makes it possible to produce a display as though the frame sign W springs inward from the center side of the screen. The frame sign W of such description is stored in the clear indication image storage unit 17, as illustrated in FIG. 2D.

The clear indication image output unit 16 repeatedly performs such displaying. Herein, in the present embodiment, as illustrated in FIG. 2D, the frame sign W is composited onto the attention-prioritized captured image, which is the narrow viewing region N, and displayed on the monitor 50. In view whereof, the composite image generation unit 18 generates a composite image where the frame sign W has been composited onto the attention-prioritized captured image. The image as per the illustration in FIG. 2C is thereby generated.

The mask region setting unit 19 sets a mask region M where at least a part of the visual scene of the periphery of the vehicle 1 pertaining to the attention-prioritized captured image is not to be displayed. In the present embodiment, the mask region M is set to be an upper part of the screen, i.e., to be a top-side portion within the attention-prioritized captured image, as illustrated in FIG. 2C. This mask region M is formed over both sides of the attention-prioritized captured image in the lateral direction. The inside of the mask region M is colored with, for example, a black color, such that visual scene above the vehicle 1 cannot be seen. It will be readily understood that the coloring may be done with another color.

In the case where the object 7 in the outside region O has entered into the region corresponding to the attention-prioritized captured image, i.e., into the narrow viewing region N, the operation image output unit 30 outputs an image where a clear indication sign is absorbed from the side of the mask region M where the object 7 is present. The question of whether or not the object 7 in the outside region O has entered into the narrow viewing region N is determined by the movement direction determination unit 15. The clear indication sign is equivalent to the sign S displayed on the monitor 50 in the case where the object 7 has entered into the narrow viewing region N. The side of the mask region M where the object 7 is present refers to a right side part of the mask region M in a case where the object 7 is present on the outside region O of the right side, and refers to a left side part of the mask region M in a case where the object 7 is present on the outside region O of the left side. An image where the clear indication sign is absorbed refers to an image where the sign S is absorbed into the mask region M and disappears. The image of such description is pre-stored in the operation image storage unit 31.

Herein, in the case where the object 7 has entered into the narrow viewing region N, the object 7 is displayed at an end part of the attention-prioritized captured image. For this reason, in the case where the object 7 has entered into the narrow viewing region N, causing the sign S to be absorbed into the mask region M makes it possible to display without causing the clear indication sign to hide the object 7 displayed at the end part of the narrow viewing region N. Accordingly, it is possible to appropriately provide a clear indication of the presence of the object 7 to the driver of the vehicle 1.

The operation image output unit 30 is configured so as to alter the display color of the mask region M from the position where the clear indication sign has been absorbed, in accompaniment with the absorption of the clear indication sign into the mask region M. Specifically, in a case where the clear indication sign has been absorbed from the right side of the mask region M, an image where the mask region M is being colored in from the right side toward the left side is outputted, and in a case where the clear indication sign has been absorbed from the left side of the mask region M, an image where the mask region M is being colored in from the left side toward the right side is outputted. Coloring the mask region M in this manner makes it also possible to provide a clear indication, to the driver of the vehicle 1, of the side from which the object 7 has entered.

Figures 4A, 4B, 4C, 4D, 4E, 4F:
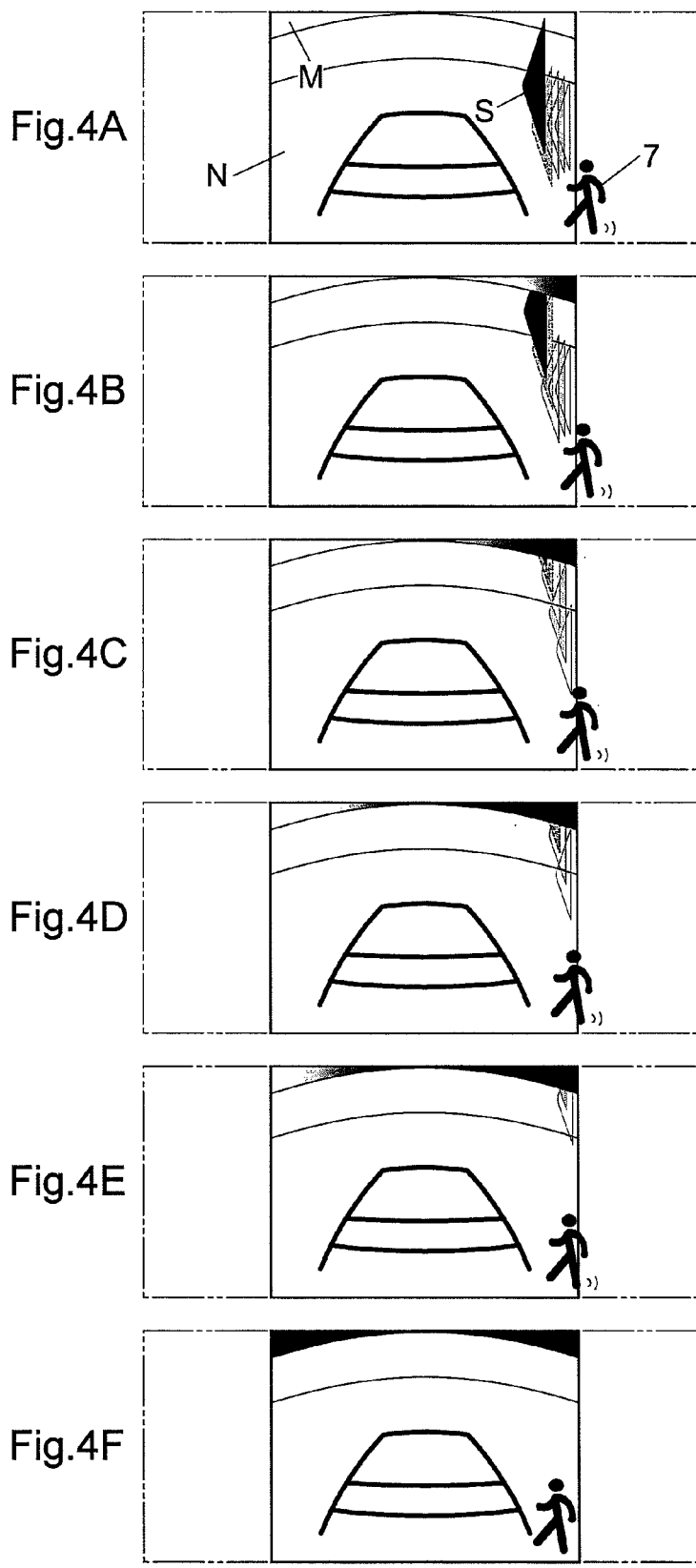
FIG. 4 is a drawing illustrating an example of the composite image according to the first embodiment.

FIGS. 3 and 4 illustrate an example of a series of images where the clear indication sign enters into the mask region M and where the mask region M is being colored. FIG. 3 illustrates an example where the sign S and the frame sign W are displayed superimposed onto the narrow viewing region N in the case where the object 7, which is in the outside region O, is moving toward the narrow viewing region N. As illustrated in FIG. 4A, the superimposition of the frame sign W is concluded when the object 7 enters from the outside region O on the right side into the narrow viewing region N. Also, as illustrated in FIGS. 4B to 4E, the sign S enters into the mask region M as though being drawn in from the right side of the mask region M. In accordance therewith, the mask region M is sequentially colored in from the right side, and ultimately the entirety of the mask region M is colored in (FIG. 4F).

The following description again refers to FIG. 1. The mask region highlighted display unit 20 highlights the display of the mask region M in a case where the object 7 in the outside region O has entered into the region corresponding to the attention-prioritized captured image, i.e., into the narrow viewing region N. In the present embodiment, a "highlighted display" refers to a flashing display. The question of whether or not the object 7 in the outside region O has entered into the narrow viewing region N is determined by the movement direction determination unit 15. The mask region highlighted display unit 20 causes the mask region M to flash in accordance with the determination results of the movement direction determination unit 15. This makes it possible to visually provide a clear indication to the occupant of the vehicle 1 that the object 7 is present in the narrow viewing region N.

The mask region highlighted display unit 20 discontinues the highlighted display of the mask region M in a case where the object 7 has withdrawn from the region corresponding to the attention-prioritized captured image, i.e., from the narrow viewing region N. It is possible for the question of whether or not the object 7 has withdrawn from the narrow viewing region N to also be determined by the movement direction determination unit 15. Specifically, it is possible for the movement direction determination unit 15 to determine that the object 7 has withdrawn from the narrow viewing region N whenever there exists the object 7 entering into the outside region O from the narrow viewing region N side of the outside region O. The determination result of such description is also transmitted to the mask region highlighted display unit 20. In the present embodiment, a "highlighted display" refers to a flashing display. Accordingly, the mask region highlighted display unit 20 discontinues the flashing of the mask region M whenever the determination result of such description is transmitted. This makes it possible to visually provide a clear indication to the occupant of the vehicle 1 that the object 7 is not present in the narrow viewing region N.

Figure 5:
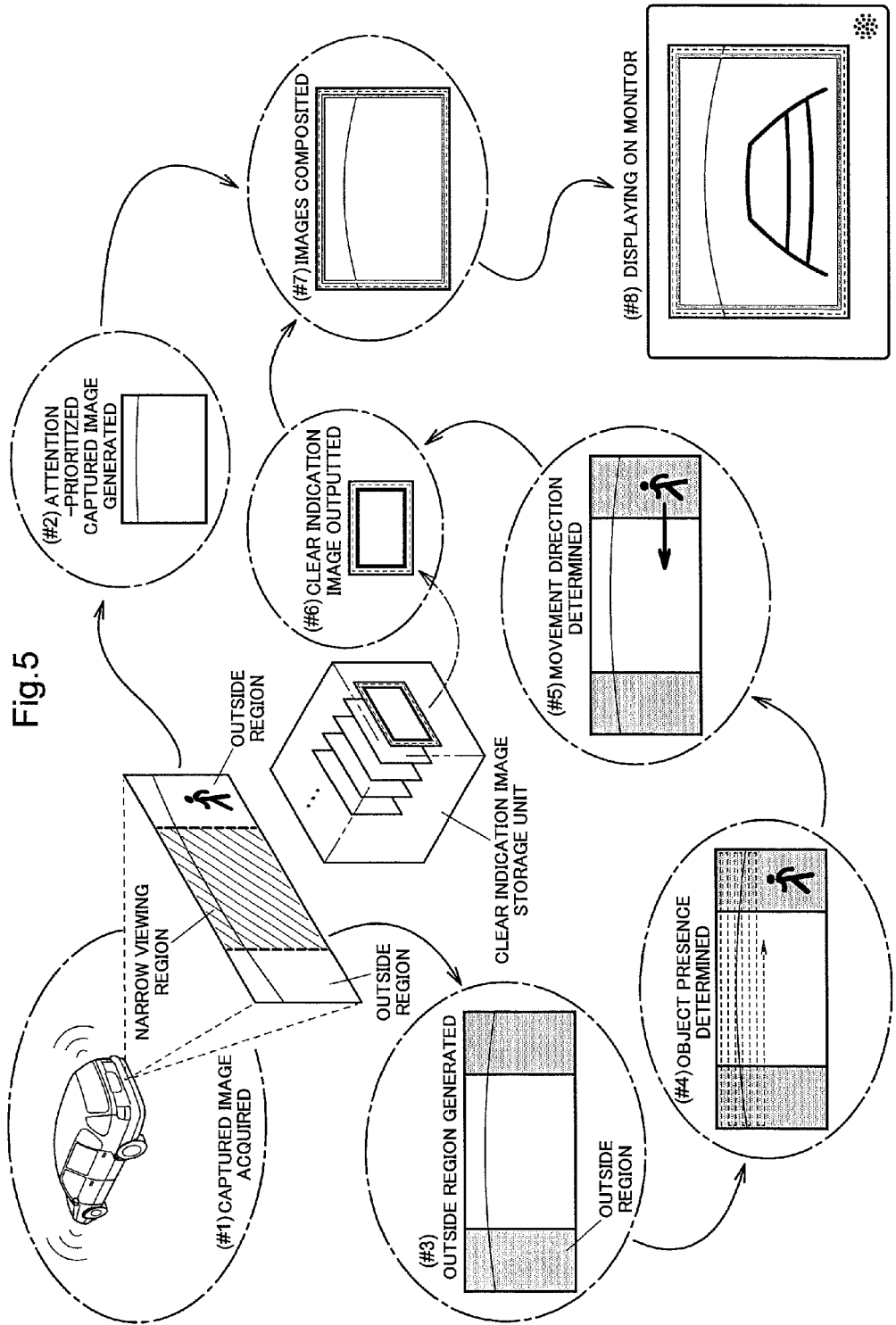
FIG. 5 is a drawing schematically illustrating processing in the obstacle alarm device according to the first embodiment.

Next, the schematic view of FIG. 5 shall be used to provide a description of the serial processing with which the obstacle alarm device 100 displays, on the monitor 50, the composite image where the clear indication image has been superimposed onto the attention-prioritized captured image. Firstly, the captured image acquisition unit 11 acquires the captured image G having been captured by the camera 5 of the vehicle 1 (step #1).

Next, the attention-prioritized captured image generation unit 12 generates, as the attention-prioritized captured image, the center portion of the acquired captured image G (step #2). Meanwhile, the outside region generation unit 13 generates, as the outside region O, the two side portions of the acquired captured image G in the lateral direction (step #3). A determination is made by the object presence determination unit 14 as to whether or not the object 7 is present in the outside region O generated in this manner (step #4).

Whenever the object 7 is determined to be present in the outside region O, the movement direction of the object 7 is determined by the movement direction determination unit 15 (step #5). In a case where the movement direction of the object 7 is from the outside region O toward the narrow viewing region N corresponding to the attention-prioritized captured image, the clear indication image is outputted by the clear indication image output unit 16 (step #6). This clear indication image is outputted by referring to the clear indication image stored in the clear indication image storage unit 17.

The composite image generation unit 18 generates the composite image by superimposing the clear indication image outputted in step #6 onto the attention-prioritized captured image generated in step #2 (step #7). The generated composite image is displayed on the monitor 50 (step #8). This large display of the attention-prioritized captured image on the monitor 50 makes it possible for the driver of the vehicle 1 to be alerted to the vicinity of the vehicle 1, and also makes it possible for the direction of the object 7 approaching the vehicle 1 to be clearly indicated. Accordingly, it is possible to become aware of the circumstances of the periphery of the vehicle 1, and it becomes possible to clearly indicate that the obstacle is approaching.

In this manner, according to the obstacle alarm device 100 according to the present invention, it is possible for the presence and the direction of the object 7 approaching the vehicle 1 to be clearly indicated to the driver, while the circumstances of the periphery of the vehicle 1 are also displayed, at a point in time where the object 7 approaching the vehicle 1 comes into the image-capturing range, even though the object 7 may not be represented in the screen of the monitor 50 provided to the vehicle 1. Accordingly, the object 7 approaching the vehicle 1 will no longer go unnoticed even in a case where the screen size of the monitor 50 is small. Because the frame sign W of such description is displayed on the side end part of the screen, it will not be harder for the driver to see the circumstances of the periphery of the vehicle 1. Accordingly, it becomes possible for presence of the obstacle (the object 7) approaching the vehicle 1 to be clearly indicated to the driver without it being harder to see the circumstances of the periphery of the vehicle 1.

2. Second Embodiment

Next, a description of the second embodiment according to the present invention shall now be provided. In the first embodiment above, a description has been provided such that the attention-prioritized captured image is the center portion of the captured image G, and the center portion of the captured image G is displayed on the monitor 50. In the second embodiment, a point of difference relative to the first embodiment resides in that the attention-prioritized captured image is the entirety of the captured image G, and in that the entirety of the captured image G is displayed on the monitor 50. Other than, in particular, the generation of the attention-prioritized captured image and the display thereof on the monitor 50, the second embodiment is similar to the aforedescribed first embodiment. The description below is primarily of the differences.

Figure 6:
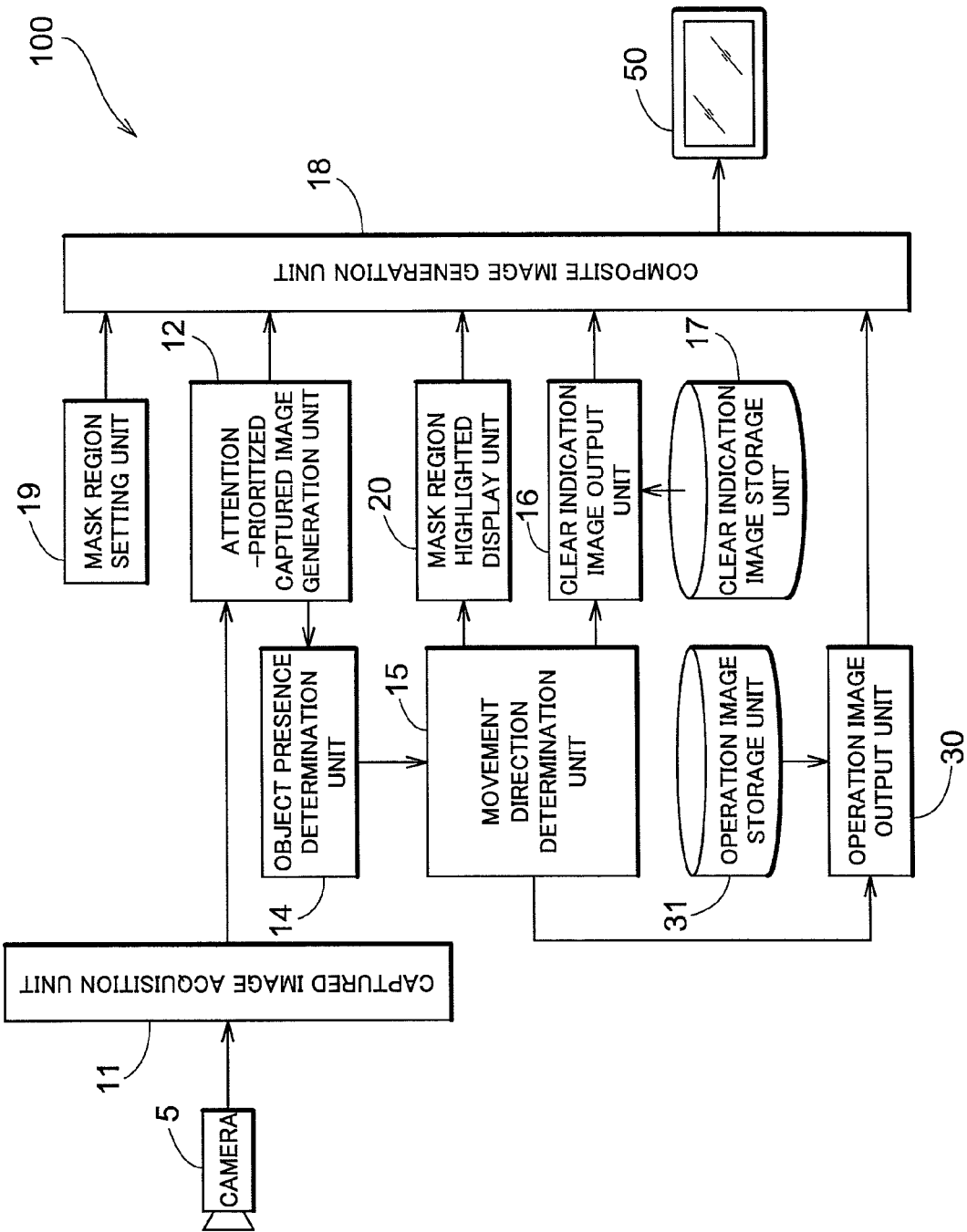
FIG. 6 is a block diagram schematically illustrating a configuration of an obstacle alarm device according to a second embodiment.

FIG. 6 illustrates a block diagram schematically illustrating the configuration of the obstacle alarm device 100 according to the present embodiment. As illustrated in FIG. 6, the obstacle alarm device 100 according to the present embodiment is configured to be provided with various functional units including the captured image acquisition unit 11, the attention-prioritized captured image generation unit 12, the object presence determination unit 14, the movement direction determination unit 15, the clear indication image output unit 16, the clear indication image storage unit 17, the composite image generation unit 18, the mask region setting unit 19, the mask region highlighted display unit 20, the operation image output unit 30, and the operation image storage unit 31. Each of the aforementioned functional units adapted for performing various forms of processing for using a CPU as a core member to clearly indicate, to a driver of a vehicle 1, the approach of an object 7 is constructed of hardware, software, or both hardware and software.

The captured image acquisition unit 11 acquires a captured image G in which an image of a visual scene of a periphery of the vehicle 1 has been captured. Similarly with respect to the aforedescribed first embodiment, the captured image acquisition unit 11 uses the camera 5 provided to the vehicle 1 to acquire the captured visual scene of the periphery of the vehicle 1 over a substantially 180° span of the rear of the vehicle 1. The image-capturing range of such description is indicated as a "wide viewing angle" in FIG. 7A. The camera 5 has the ability to output video as a captured image G in real-time.

FIG. 7B illustrates an example of the captured image G of such description. The entire width of FIG. 7B corresponds to the wide viewing angle of FIG. 7A. In FIG. 7B, too, mirror image processing is performed for the display, similarly with respect to FIG. 2B.

The attention-prioritized captured image generation unit 12 generates an attention-prioritized captured image on the basis of the captured image G. In the present embodiment, the attention-prioritized captured image generation unit 12 generates, as the attention-prioritized captured image, a wide viewing region B, which is the entirety of the captured image G. Herein, in the present embodiment, the imaging range of the captured image G is a range composed of a substantially 180° field of view. For this reason, the wide viewing region B is an image having a field of view of substantially 180°. FIG. 7B is an illustration of the attention-prioritized captured image which is the wide viewing region B. In the present obstacle alarm device 100, the attention-prioritized captured image of such description corresponds to the display image displayed on the monitor 50 (see FIG. 7C). FIGS. 7B and 7C, in order to facilitate understanding, include dashed lines which indicate the range of an image having, for example, an about 120° to 130° field of view behind the vehicle 1, as in the narrow viewing angle illustrated in FIG. 7A; however, the dashed lines may also not be displayed on the monitor 50 in actual practice. In the following description, the image sandwiched by the two dashed lines in order to facilitate understanding is called the "narrow viewing region N" (see FIG. 7B).

The object presence determination unit 14 determines whether or not the object 7 is present in the periphery of the vehicle 1. In the present embodiment, the object presence determination unit 14 determines whether or not the object 7 is present in the region corresponding to the attention-prioritized captured image. The attention-prioritized captured image is transmitted from the attention-prioritized captured image generation unit 12. The "region corresponding to the attention-prioritized captured image" refers to the region in real-space corresponding to the attention-prioritized captured image. In the present embodiment, the object presence determination unit 14 determines whether or not the object 7 is present in the wide viewing region B. The determination of such description is performed by referring to the attention-prioritized captured image and using, for example, pattern matching or another known form of image recognition processing. It will be readily understood that processing other than pattern matching can be used to determine whether or not the object 7 is present in the attention-prioritized captured image. The determination results from the object presence determination unit 14 are transmitted to the movement direction determination unit 15, which shall be described below.

The movement direction determination unit 15 determines the movement direction of the object 7. The "object 7" refers to the object 7 determined to be present in the wide viewing region B by the object presence determination unit 14. The determination of the movement direction of such description is performed in a case where a determination has been made by the object presence determination unit 14 that the object 7 is present in the wide viewing region B. In particular, in the present embodiment, a determination is made by the movement direction determination unit 15 as to whether or not the object 7 in the region corresponding to the attention-prioritized captured image is moving toward the center of the attention-prioritized captured image. "Moving toward the center of the attention-prioritized captured image" means moving toward the center of the wide viewing region B, and indicates movement behind the vehicle 1 from outside the width direction of the vehicle 1 and in the direction of being directly behind the vehicle 1. The determination of such description can possibly also be performed by, for example, comparing the position of the object 7 in the most recent captured image G and the position of the object 7 in the captured image G from a predetermined duration of time prior, or can be performed using a known technique such as one using optical flow. The determination results of the movement direction of such description are transmitted to the clear indication image output unit 16, which shall be described below.

In a case where a determination has been made by the movement direction determination unit 15 that the object 7 is moving toward the center of the wide viewing region B, the clear indication image output unit 16 causes the sign S, which is turned on for a fixed duration of time and thereafter turned off, to be displayed at sequentially varying positions centerward from the side in the attention-prioritized captured image where the object 7 is present, and repeatedly performs the relevant displaying. In the present embodiment, the sign S of such description is displayed centerward from the outer edge part of the narrow viewing region N within the screen of the monitor 50 (the region sectioned by the dashed lines in FIG. 7C). Accordingly, in the present embodiment, too, the sign S, which is turned on for a fixed duration of time and thereafter turned off, is displayed at sequentially varying positions within the narrow viewing region N centerward from the outer edge part of the narrow viewing region N in which the object 7 is present, in a case where the object 7 is moving toward the center of the attention-prioritized captured image.

Furthermore, in a case where a determination has been made by the movement direction determination unit 15 that the object 7 is moving toward the center of the attention-prioritized captured image, the clear indication image output unit 16 causes the frame sign W, which has a smaller outer shape than the outline of the attention-prioritized captured image and is turned on for a fixed duration of time and thereafter turned off, to be displayed at sequentially varying positions centerward from the outer edge part of the attention-prioritized captured image, and repeatedly performs the relevant displaying. Herein, in the present embodiment, the attention-prioritized captured image is equivalent to the wide viewing region B. Accordingly, in a case where the object 7 is moving toward the center of the wide viewing region B, the clear indication image output unit 16 causes the frame sign W, which has a smaller outer shape than the outline of the wide viewing region B and is turned on for a fixed duration of time and thereafter turned off, to be displayed at sequentially varying positions centerward from the outer edge part of the wide viewing region B, and repeatedly performs the relevant displaying. Herein, as described above, the attention-prioritized captured image, which is the wide viewing region B, is displayed on the monitor 50. Accordingly, that the frame sign W has a smaller outer shape than the outline of the wide viewing region B signifies that the frame sign W is of smaller size than the screen of the monitor 50. The question of whether or not the object 7 is moving toward the center of the wide viewing region B of the vehicle 1 is determined by the aforedescribed movement direction determination unit 15.

The frame sign W is caused to be displayed at sequentially varying positions centerward from the outer edge part of the attention-prioritized captured image in accordance with the movement of the sign S toward the center of the attention-prioritized captured image. In the present embodiment, "is displayed at sequentially varying positions" indicates not a state where the frame sign W is being displayed continuously but rather a state where the frame sign W is displayed while moving in a flashing manner. Accordingly, the frame sign W is displayed so as to gradually become smaller. The clear indication image output unit 16 repeatedly moves the frame sign W of such description while it flashes.

Herein, a description of the frame sign W shall now be provided. As illustrated in FIG. 7C, in the present embodiment, a plurality of the frame signs W are sometimes displayed on the monitor 50. In such a case, the frame sign W is configured such that a frame sign W to be displayed later is of smaller size than a frame sign W displayed immediately prior. The frame sign W is also configured such that the frame sign W to be displayed later has a lower transparency than does the frame sign W displayed immediately prior. This makes it possible to produce a display as though the frame sign W springs inward from the center side of the screen. The frame sign W of such description is stored in the clear indication image storage unit 17, as illustrated in FIG. 7D, together with the arrow-shaped sign S.

The clear indication image output unit 16 repeatedly performs such a display. Herein, in the present embodiment, the frame sign W is composited onto the attention-prioritized captured image together with the arrow-shaped sign S and displayed on the monitor 50, as illustrated in FIG. 7C. In view whereof, the composite image generation unit 18 generates the composite image where the frame sign W and the arrow-shaped sign S have been composited onto the attention-prioritized captured image. The image as per the illustration in FIG. 7C is thereby generated.

Displaying the frame sign W in such a manner makes it possible to cause the frame sign W to be displayed so as to be gradually approaching. This makes it possible to visually provide a clear indication to the occupant of the vehicle 1 that the object 7 is approaching the vehicle 1.

Figures 8A, 8B, 8C, 8D, 8E, 8F:
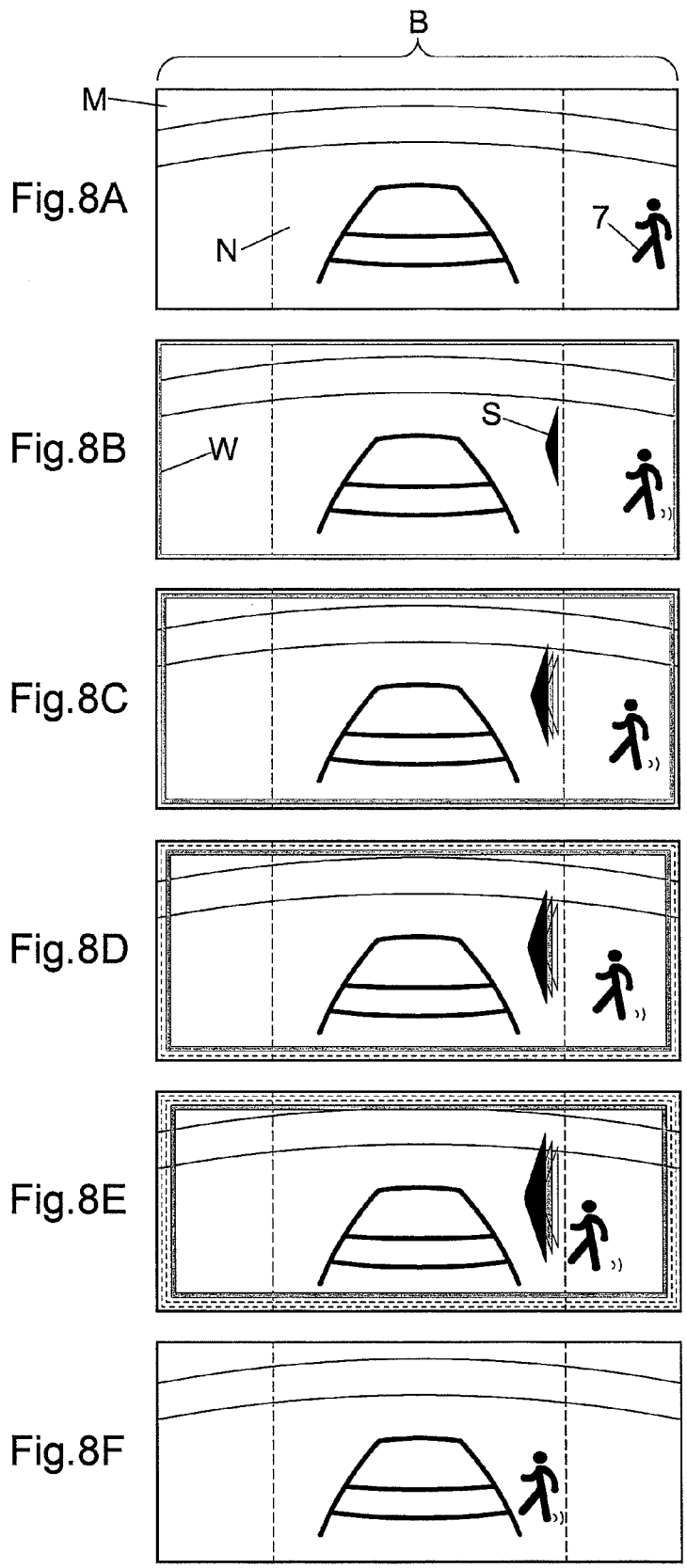
FIG. 8 is a drawing illustrating an example of a composite image according to the second embodiment.

FIG. 8 illustrates an example of a series of images where the arrow-shaped sign S and frame sign W of such description are displayed. FIG. 8 is an illustration of an example where the arrow-shaped sign S and the frame sign W are displayed superimposed onto the attention-prioritized captured image in the case where the object 7, which is in the region corresponding to the attention-prioritized captured image, is moving toward the center of the wide viewing region B. In FIG. 8, an arrow shape is repeatedly displayed at the outer edge part of the image corresponding to the narrow viewing region N until the object 7 enters into the narrow viewing region N. The frame sign W is repeatedly displayed until the object 7 enters into the narrow viewing region N. Specifically, the display in FIGS. 8B to 8E is repeatedly performed. As illustrated in FIG. 8F, in a case where the object 7 enters into the narrow viewing region N sectioned by the dashed lines, the outputting of the arrow-shaped sign S and of the frame sign W is discontinued by the clear indication output unit 16. Thereupon, similarly with respect to the aforedescribed first embodiment, the configuration may be such that the arrow-shaped sign S enters into the mask region M as though being drawn in from the vicinity of the region corresponding to the narrow viewing angle on the right side whenever the object 7 enters into the region corresponding to the narrow viewing angle from the right side. It will be readily understood that the configuration can further be such that, in accordance therewith, the mask region M is sequentially colored in from both sides of the mask region M, and ultimately the entirety of the mask region M is colored in. Further, the configuration can also be such that the mask region highlighted display unit 20 highlights the display of the mask region M such that the display thereof is flashing.

Figure 9:
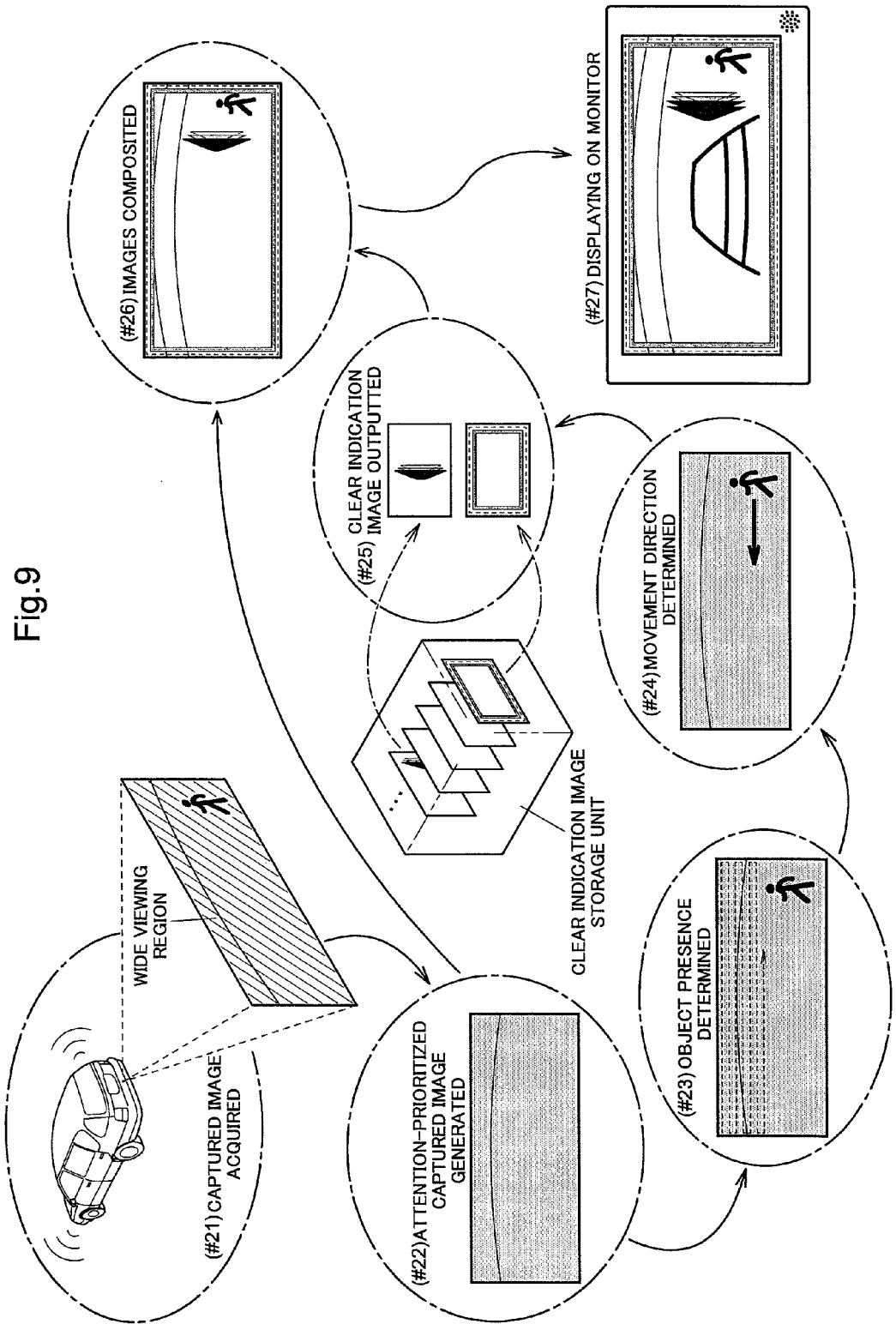
FIG. 9 is a drawing schematically illustrating processing in the obstacle alarm device according to the second embodiment.

Next, the schematic view of FIG. 9 shall be used to provide a description of the serial processing with which the obstacle alarm device 100 displays, on the monitor 50, the composite image where the frame sign W has been superimposed onto the attention-prioritized captured image. Firstly, the captured image acquisition unit 11 acquires the captured image G having been captured by the camera 5 of the vehicle 1 (step #21).

Next, the attention-prioritized captured image generation unit 12 generates, as the attention-prioritized captured image, the entirety of the acquired captured image G (step #22). A determination is made by the object presence determination unit 14 as to whether or not the object 7 is present in the wide viewing region B corresponding to the attention-prioritized captured image generated in this manner (step #23).

Whenever the object 7 is determined to be present in the wide viewing region B, the movement direction of the object 7 is determined by the movement direction determination unit 15 (step #24). In a case where the movement direction of the object 7 is toward the center of the wide viewing region B, the clear indication image is outputted by the clear indication image output unit 16 (step #25). This clear indication image is outputted by referring to the clear indication image stored in the clear indication image storage unit 17.

The composite image generation unit 18 generates the composite image by superimposing the clear indication image outputted in step #25 onto the attention-prioritized captured image generated in step #22 (step #26). The generated composite image is displayed on the monitor 50 (step #27). This manner of displaying the clear indication image (the arrow-shaped sign S and the frame sign W) on the attention-prioritized captured image makes it possible for the driver of the vehicle 1 to be alerted to the vicinity of the vehicle 1. Accordingly, it is possible to become aware of the circumstances of the periphery of the vehicle 1, and it becomes possible to clearly indicate that the obstacle is approaching.

In this manner, according to the obstacle alarm device 100 according to the present invention, because the frame sign W is displayed within the attention-prioritized captured image in accordance with the object 7 approaching the vehicle 1, the object 7 approaching the vehicle 1 will no longer go unnoticed even in a case where the screen size of the monitor 50 is small. Further, because the frame sign W of such description is displayed on the side end part of the screen, it will also no longer be harder for the driver to see the circumstances of the periphery of the vehicle 1. Specifically, because the visual scene displayed on the end part of the screen will not be hidden by the frame sign W, it becomes possible to appropriately become aware of the object 7 even in a case where the object 7 rapidly springs out. Accordingly, it becomes possible to clearly indicate to the driver the presence of the obstacle (the object 7) approaching the vehicle 1 to be clearly indicated to the driver without it being harder to see the circumstances of the periphery of the vehicle 1.

3. Other Embodiments

In the description of the embodiments above, the clear indication image output unit 16 produces a display such that the sign S displayed in a flashing manner gradually becomes larger while moving. However, in the present invention, the scope of applicability is not limited thereto. It will be readily understood that the sign S can also be displayed at the same size. It will also be readily understood that the display can also be such that the sign S gradually becomes smaller. It is still possible with such a configuration to appropriately provide a clear indication of the object 7 approaching the vehicle 1 to the driver of the vehicle 1.

In the description of the embodiments above, the sign S displayed immediately prior is more transparent than the sign displayed later. However, the scope of applicability of the present invention is not limited thereto. For example, it will be readily understood that the sign S displayed immediately prior can be displayed at a lower transparency than the sign displayed later, or that the sign S displayed immediately prior can be displayed as though having the same transparency as the sign S displayed later.

In the description of the embodiments above, in a case where there are a plurality of the signs S, the plurality of signs S are displayed at partially superimposed positions. However, the scope of applicability of the present invention is not limited thereto. Even in the case where the plurality of the signs S are displayed, it is still possible for the configuration to be such that there is no superimposition between the signs S.

In the description of the embodiments above, the sign S is configured to be arrow-shaped, having a convex part projecting toward the center of the narrow viewing region N. However, the scope of applicability of the present invention is not limited thereto. It will be readily understood that the sign S can also be configured in another shape.

In the description of the embodiments above, in the case where the object 7 in the outside region O has entered into the region corresponding to the attention-prioritized captured image (into the narrow viewing region N), the operation image output unit 30 outputs the image where the clear indication sign is absorbed from the side of the mask region M where the object 7 is present. However, the scope of applicability of the present invention is not limited thereto. As illustrated in FIG. 10, it is also possible for the configuration to be such that the clear indication image output unit 16 discontinues the outputting of the sign S in a case where the object 7 has entered into the region corresponding to the attention-prioritized captured image (into the narrow viewing region N). It will be readily understood that in such a case, it is also possible for the configuration to be such that the outputting of the frame sign W is also discontinued. The question of whether or not the object 7 has entered into the narrow viewing region N is determined by the aforedescribed movement direction determination unit 15. In the case where the object 7 has entered into the narrow viewing region N, the object 7 is displayed at the end part of the attention-prioritized captured image. For this reason, it is still possible for the object 7 displayed at the end part of the attention-prioritized captured image to be viewed by the driver of the vehicle 1 without being hidden by the clear indication image even in the case where the outputting of the clear indication image is stopped in this manner.

In the description of the embodiments above, there are sometimes pluralities of the sign S and the frame sign W displayed within the screen. However, the scope of applicability of the present invention is not limited thereto. It is also possible for the configuration to be such that the sign S and the frame sign W are each displayed one at a time within the screen, and possible for the configuration to be such that only the sign S is displayed.

In the description of the embodiments above, in a case where there are a plurality of the frame signs W, the frame sign W displayed later is displayed at a smaller size than the frame sign W displayed immediately prior. However, the scope of applicability of the present invention is not limited thereto. It will be readily understood that the frame sign W can also be displayed at the same size. It will further be readily understood that the frame sign W can also be displayed so as to gradually become larger. It is still possible with such a configuration to appropriately provide a clear indication of the object 7 approaching the vehicle 1 to the driver of the vehicle 1.

In the description of the embodiments above, in the case where there are a plurality of the frame signs W, the frame sign W displayed later has a lower transparency than does the frame sign W displayed immediately prior. However, the scope of applicability of the present invention is not limited thereto. It will be readily understood that, for example, it is also possible for the frame sign W displayed immediately prior to be displayed at a lower transparency than is the frame sign W displayed later, and also possible for the frame sign W displayed immediately prior to be displayed at the same transparency as the frame sign W displayed later.

In the first embodiment described above, the attention-prioritized captured image generation unit 12 generates the center portion of the captured image G as the attention-prioritized captured image. However, the scope of applicability of the present invention is not limited thereto. It will be readily understood that the configuration can be such that the attention-prioritized captured image generation unit 12 generates, as the attention-prioritized captured image, a portion which is not the center portion of the captured image G, i.e., a portion that has been shifted away from the center of the captured image G.

In the description of the embodiments above, the determination of whether or not the object 7 is present is performed using, for example, pattern matching or another known form of image recognition processing. However, the scope of applicability of the present invention is in no way limited thereto. It will be readily understood that, for example, a detection can be made using sonar or the like.

In the first embodiment described above, the attention-prioritized captured image generation unit 12 generates, as the attention-prioritized captured image, the narrow viewing region N, which is the center portion of the captured image G. However, the scope of applicability of the present invention is not limited thereto. It will be readily understood that it is also possible for the captured image G to be used without alteration as the attention-prioritized captured image in, for example, a case where the captured image G has been acquired using the camera 5 having a narrow viewing angle corresponding to the narrow viewing region N. In such a case, the determination of whether or not the object 7 is present in the outside region O is preferably detected using, for example, sonar or the like, as described above.

It will be readily understood that the first embodiment and the second embodiment may also be provided together in a single device. In such a case, preferably, the first embodiment and the second embodiment are preferably configured so as to be manually or automatically interchangeable.

INDUSTRIAL APPLICABILITY

The present invention can be used for an obstacle alarm device for clearly indicating the presence of an obstacle approaching a vehicle to an occupant thereof.

1: Vehicle
7: Object
11: Captured image acquisition unit
12: Attention-prioritized captured image generation unit
14: Object presence determination unit
15: Movement direction determination unit
16: Clear indication image output unit
100: Obstacle alarm device
G: Captured image
O: Outside region
W: Frame sign

The invention claimed is:

1. A method for an obstacle alarm, the method comprising:
acquiring a captured image in which an image of a visual scene of a periphery of a vehicle has been captured;
generating an attention-prioritized captured image on the basis of the captured image, the captured image being the image of the visual scene of a rearward periphery of the vehicle;
determining whether or not an object is present in the periphery of the vehicle;
determining a movement direction of the object; and
causing a frame sign, which has a smaller outer shape than an outline of the attention-prioritized captured image and is to be displayed at sequentially varying positions from an outer edge part of the attention-prioritized captured image toward a center of the attention-prioritized captured image, and for repeatedly performing displaying the frame sign as the frame sign at varying centerward positions, so as to gradually become smaller, where it is determined that the object is moving toward the center of the attention-prioritized captured image,
wherein the outer shape of the frame sign is similar to the outline of the attention-prioritized captured image.

2. The method for an obstacle alarm according to claim 1, wherein:
generating the attention-prioritized captured image comprises generating a center portion of the captured image as the attention-prioritized captured image, and
determining whether or not an object is present in the periphery of the vehicle comprises determining whether or not the object is present in an outside region of the exterior of the attention-prioritized captured image.

3. The method for an obstacle alarm according to claim 1, wherein:
generating the attention-prioritized captured image comprises generating the entirety of the captured image as the attention-prioritized captured image, and
determining whether or not an object is present in the periphery of the vehicle comprises determining whether or not the object is present in a region corresponding to the attention-prioritized captured image.

4. The method for an obstacle alarm according to claim 1, characterized in that:
in a case where there are a plurality of frame signs, a frame sign displayed later is of smaller size than a frame sign displayed immediately prior.

5. The method for an obstacle alarm according to claim 1, characterized in that:
in a case where there are a plurality of frame signs, a frame sign displayed later is of lower transparency than a frame sign displayed immediately prior.

6. The method for an obstacle alarm according to claim 1, wherein:
the displaying of the frame sign is discontinued in a case where the object has entered a region corresponding to the attention-prioritized captured image.

7. The method for an obstacle alarm according to claim 1, wherein the attention-prioritized captured image corresponds to a part or an entirety of the captured image.

* * * * *